(12) United States Patent
Bohrer et al.

(10) Patent No.: US 6,337,057 B1
(45) Date of Patent: Jan. 8, 2002

(54) PROCESS FOR THE DIRECT PRODUCTION OF GERMANIUM TETRACHLORIDE FROM HYDRATED GERMANATE-CONTAINING SOLIDS USING GASEOUS HYDROGEN CHLORIDE

(75) Inventors: Michael Philip Bohrer, Lebanon; Po-Yen Lu, Mendham; Lawrence Seibles, Piscataway, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/338,532

(22) Filed: Jun. 23, 1999

(Under 37 CFR 1.47)

(51) Int. Cl.[7] .................. C01G 17/00; C01G 17/04; C22B 41/00
(52) U.S. Cl. .................. 423/96; 423/494; 423/240 R
(58) Field of Search .................. 423/89, 96, 494, 423/240 R (56) References Cited

U.S. PATENT DOCUMENTS

| 2,767,052 A | * | 10/1956 | Harner et al. |
| 2,811,418 A | * | 10/1957 | Theuerer |
| 2,895,797 A | | 7/1959 | Hill et al. |
| 3,760,060 A | | 9/1973 | Morgan |
| 3,992,159 A | | 11/1976 | Mitchell |
| 4,090,871 A | * | 5/1978 | Lebleu et al. |
| 4,385,915 A | | 5/1983 | Amelse et al. |
| 4,578,256 A | | 3/1986 | Gill et al. |
| 4,695,436 A | | 9/1987 | Wyndham et al. |
| 4,775,479 A | | 10/1988 | Schügerl et al. |
| 4,886,648 A | | 12/1989 | Menendez et al. |
| 4,981,569 A | | 1/1991 | Schügerl et al. |

FOREIGN PATENT DOCUMENTS

| DE | 953792 | 6/1954 |
| DE | XP-002148138 | 3/1958 |
| GB | 752407 | 7/1956 |
| JP | 06001612 | 11/1994 |

* cited by examiner

*Primary Examiner*—Steven P. Griffin
*Assistant Examiner*—Christina Ildebrando
(74) *Attorney, Agent, or Firm*—Dickstein Shapiro Morin & Oshinsky LLP (57) ABSTRACT

The invention relates to a system and method for the recovery of germanium from the Modified Chemical Vapor Deposition (MCVD) processing wastes by chemical conversion and recovery of germanium from the solid cake product. In the present method, the direct reaction of gaseous hydrogen chloride with the recovered materials effects the rapid and complete chlorination of the germanates, yielding germanium tetrachloride. The germanium tetrachloride product is completely volatilized and removed from the mixture during the exothermic process.

35 Claims, 7 Drawing Sheets

GERMANIUM TETRACHLORIDE

FIG. 9

PROCESS FOR THE DIRECT PRODUCTION OF GERMANIUM TETRACHLORIDE FROM HYDRATED GERMANATE-CONTAINING SOLIDS USING GASEOUS HYDROGEN CHLORIDE

BACKGROUND OF THE INVENTION

1. Field of the Invention

The present invention relates to a system and method for the recovery of germanium from Modified Chemical Vapor Deposition (MCVD) processing wastes by chemical conversion by contact with a gas and for recovery of germanium from the solid cake product.

2. Description of the Related Art

Presently, optical components such as optical fibers are being manufactured through a sequence of manufacturing steps which include the reactions of a silicon containing gas, such as silicon tetrachloride, and reactions of a germanium containing gas, such as germanium tetrachloride, to form a glass with desirable optical properties. In such processes, the effluents from the induced germanium and silicon reactions are vented to the atmosphere. Such effluents typically included a significant amount of particulate as well as gaseous materials. For example, generally in typical manufacturing processes $SiCl_4$ reacts with $O_2$ (as in the MCVD process described in J. B. MacChesney, "Materials and Processes for Preform Fabrication-Modified Chemical Vapor Deposition," Proceedings of IEEE, 68, 1181–1184 (1980)) or $O_2$ and $H_2$ (as in the soot process described in P. C. Shultz, "Fabrication of Optical Waveguides by the Outside Vapor Deposition Process," Proceedings of IEEE, 68, 1187–1190 (1980) or as in the VAD process described in T. Izawa and N. Inagaki, "Materials and Processes for Fiber Preform Fabrication-Vapor Phase Axial Deposition," Proceedings of IEEE, 68, 1184–1187 (1980)) to produce particulate $SiO_2$ with close to 100 percent efficiency and with approximately 50 percent incorporation of these $SiO_2$ particulates into the glass body being fabricated.

In the production of optical waveguide materials by the Modified Chemical Vapor Deposition (MCVD) process, a large quantity of high purity germanium tetrachloride is used. A considerable portion (about 80%) of this expensive reagent appears in the MCVD effluent stream as unreacted $GeCl_4$ and amorphous $SiO_2$ particulates which contain upwards of 15 wt % germanium. This inefficiency coupled with increasing costs incurred for optical grade $GeCl_4$ led to the implementation of a process for recovering germanium from the MCVD effluent stream.

As noted above, the gaseous portion of the effluent contains a large portion of the discarded germanium. By removing the germanium in these gases and collecting it in a state suitable for recycling, a substantial reduction in the cost of manufacturing optical fibers is achieved. An effective means for removing the germanium from the gas phase and, incidentally, any germanium in particulate form, involves a recirculating process as discussed in U.S. Pat. No. 4,385,915, which is herein incorporated by reference. In this process, the manufacturing effluent is treated with an aqueous medium to ensure dissolution of germanium containing gases such as $GeCl_4$ through the processes of absorption and hydrolysis of the absorbed gas in the medium. The aqueous medium is filtered of particulates and recycled for addition of more effluent and for refiltration. Through the use of a basic or acidic media, a substantial amount of the particulate matter is also dissolved prior to filtration. Thus, the concentration of germanium in the medium is substantially increased by the recycling process and by the dissolution of germanium containing particulates. A relatively small percentage of the recycling medium is periodically or continuously removed for precipitation of germanium. The removed portion is treated with a multivalent cation such as $Mg^{+2}$ to induce the formation of a corresponding precipitate such as $MgGeO_3$. The precipitate is then separated from the remaining liquid by conventional means.

Conventional methods for processing germanium in filter cake include conventional industrial level processing of germanium concentrates derived from Ge-bearing ores and other germanium raw materials. Well-established industrial methods for the production of $GeCl_4$ from Ge-bearing ores invariably utilize concentrated liquid hydrochloric acid for the chemical treatment of germanium concentrates. The $GeCl_4$ produced is then separated by azeotropic distillation from aqueous HCl. The prior methods for the recovery of germanium had several drawbacks. For example, the prior methods could not efficiently process filter cakes having high water content. The prior recovery methods also added additional liquid to the system which had to be removed by drying or other methods. The prior methods also required thermal energy to be input to separate the germanium product from the filter cake. In addition, in order to separate $GeCl_4$ from a host of associated elements (As, Sb, Sn, etc.) that may be present in the concentrates, the distillation of $GeCl_4$ according to the prior methods needed to be carried out under oxidizing conditions ($Cl_2$, $H_2O_2$, $KMNO_4$, Cu, etc.) which converted these constituents to non-volatile forms. The present invention overcomes these drawbacks.

SUMMARY OF THE INVENTION

The present invention relates to a system and method for the recovery of germanium from the MCVD processing wastes by chemical conversion from a solid cake product. In the present method, the direct reaction of gaseous hydrogen chloride with the MCVD wastes (filter cake) effects the rapid and complete chlorination of the germanates, yielding germanium tetrachloride. The germanium tetrachloride product is completely volatilized and removed from the mixture during the exothermic process. The $GeCl_4$ product may then be recovered by cryogenic methods.

The above and other advantages and features of the invention will be more clearly understood from the following detailed description which is provided in connection with the accompanying drawings.

DETAILED DESCRIPTION OF PREFERRED EMBODIMENTS

The present invention will now be described with relation to laboratory and field procedures and apparatus for the recovery of germanium in the form of germanium tetrachloride from germanate containing solids. It should be understood that the invention has broader applicability and may also be used to recover other compounds such as arsenic or the like. Additionally, while the process below is described with respect to hydrogen chloride gas as the gaseous chlorinating agent, it should be understood that other gaseous chlorinating agents may be used in the process of the present invention. Similarly, the process described below is but one method of many that could be used according to the present invention.

Germanium is recovered from germanium containing ore according to the present invention by contacting a germanate containing solid with a gaseous chlorinating agent to produce a germanium tetrachloride product. The gaseous chlorinating agent may be any suitable gaseous chlorinating agent, such as, for example, hydrogen chloride or the like. The present invention also contemplates the reaction of the germanate containing solid with other gases, such as, for example, hydrogen bromide to form a germanium tetrabromide from which germanium may also be recovered.

The germanate containing solid is contacted with the gaseous reaction agent, which for simplicity will be referred to as a gaseous chlorinating agent. The germanate solid is contacted with the gaseous chlorinating agent at a sufficient flow rate of gaseous chlorinated reactant and for a sufficient period of time to facilitate an exothermic reaction between the gaseous chlorinating agent and the germanate containing solid. It should be understood that the time and amount of reactant will be dependent upon several factors, such as the chemical composition of the germanate containing solid, the specific gaseous chlorinating agent, the quality of the gas/liquid contact or the like; however, the reaction time will generally be in the range of from about 5 to about 120 minutes, preferably from about 10 to about 40 minutes.

The flow rate of the gaseous chlorinating agent to be reacted with the germanate containing solid depends upon several factors such as the amount of germanate containing solid and the surface area of the germanate containing solid. The flow rate of the gaseous chlorinating agent is thus dependent upon the amount of germanate containing solid present in the reaction vessel. Thus, the flow rate of the gaseous chlorinating agent according to the invention should be on the order of from about 1 to about 100 liters gas/min/kg germanate containing solid. Preferably the flow rate of the gaseous chlorinating agent will be from about 5 to about 30 liters gas/min/kg germanate containing solid. The gaseous chlorinating agent is reacted with the germanate containing solid in a molar amount of from about 8 mol/kg solid to about 50 mol/kg solid, preferably from about 12 mol/kg solid to about 20 mol/kg solid, depending upon the reaction conditions.

The germanate containing solid may be any germanium containing ore but is preferably a germanium containing solid in the form of a filter cake or the like. Most preferably, the germanium ore is the by-product of the MCVD process as set forth in more detail above. The germanium tetrachloride recovered from the reaction of the germanate containing solid with the gaseous chlorinating agent may then be recovered from the reaction by-product by known cryogenic methods.

Figure 1:
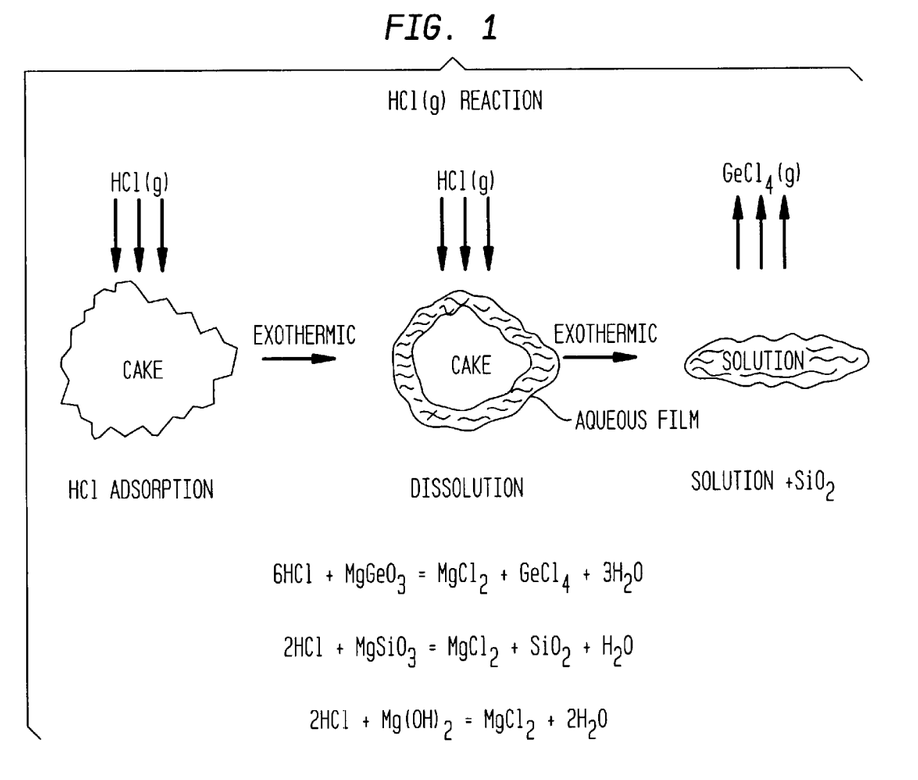
FIG. 1 shows a schematic diagram and the basic chemical reactions of the reaction of HCl-with the filter cake.

The present invention is an improvement over conventional methods which have difficulty processing filter cakes having a high water content (78–80 wt %). In the present invention, HCl gas is preferably employed as the chlorinating agent and, as illustrated in FIG. 1, the exposure of the filter cake to HCl(g) produces a vigorous exothermic reaction that results in rapid liquification of the cake and evolution of $GeCl_4$. Representative chemical reactions which relate to the conversion process are shown below.

$6HCl + MgGeO_3 => MgCl_2 + GeCl_4 + 3 H_2O$
$2HCl + MgSiO_3 => MgCl_2 + SiO2 + H_2O$
$2HCl + Mg(OH)_2 => MgCl_2 + 2 H_2O$

Figure 2:
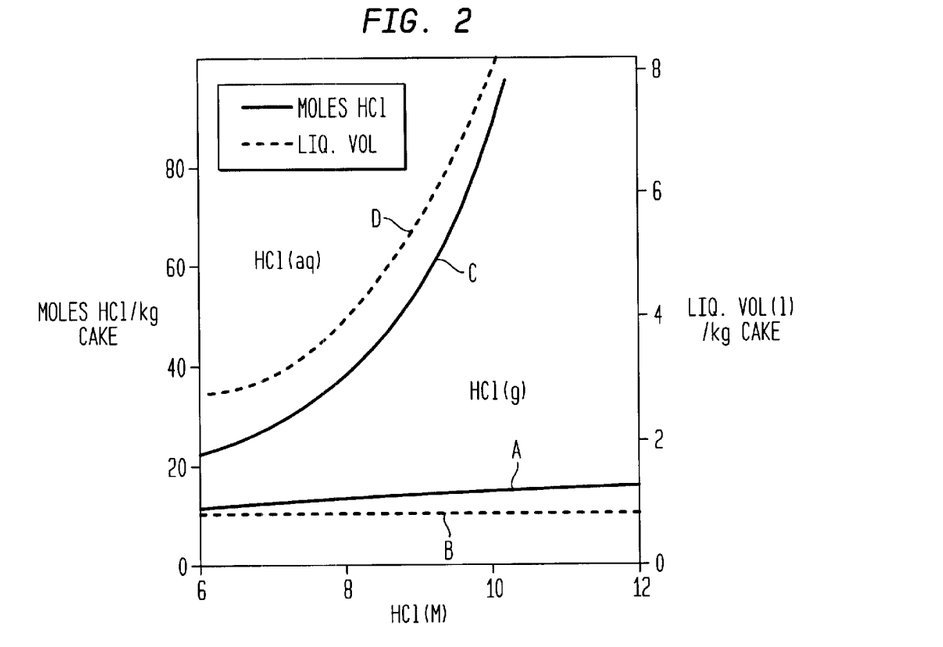
FIG. 2 is a graph showing the moles of HCl reagent and the total liquid volume generated in the treatment of the filter cake as a function of final HCl concentration in the reaction mixture.

By reacting the germanate containing solid with a gaseous reactant, the method according to the present invention eliminates the large amounts of water that are ordinarily added to the system when a concentrated liquid acid is employed as the chlorinating agent. Reference is made to FIG. 2. This figure shows the calculated number of moles of HCl per kg of filter cake, in gaseous form (line A) and as concentrated acid (line C), that would be required to maintain a solution having a predetermined HCl concentration in the reaction. The total volume of solution that would result from the addition of gaseous HCl as the chlorinating agent (line B) and the total volume that would result from the addition of concentrated acid (line D) is also plotted versus the final reaction conditions (HCl concentration). It is evident from the figure that a more efficient use of the chlorination agent and a significant reduction in the size of equipment (based on reduced liquid volume) can be achieved by using a gaseous chlorinating agent. As can be seen from the figure, there exists a substantially linear relationship between the number of moles of HCl (g) and the total system volume whereas when reacting the solid with a liquid hydrochloric acid, there is an asymptotic relationship between the number of moles of HCl and the total volume. Therefore, the present invention achieves a more efficient use of the chlorinating agent without an exponential increase in total volume of the system.

The method of the present invention further does not require drying of the filter cake prior to reaction. Experiments conducted on partially and completely dried filter cake samples show that drying of the filter cake is not necessary in the practice of the present invention. In fact, when the water content of the filter cake is reduced by 50%, the resulting materials exhibit a rather sluggish, although exothermic, reaction with HCl gas. The liberated heat stimulates further dehydration, with negligible evolution of $GeCl_4$, and leads to a compacted, dry solid which does not readily dissolve in concentrated hydrochloric acid.

In addition, while conventional hydrochloric acid processing methods require the input of thermal energy to effect the separation of $GeCl_4$ (bp=33.1° C.) from reaction residues, detailed calculations of the enthalpy output for the HCl(g) reaction (Table 1 below) indicate that the thermal energy liberated by the exothermic process of the present invention (−211 kcal/kg cake) is sufficient to induce rapid and complete volatilization of the $GeCl_4$ produced from the reaction of the HCl(g) and the germanate containing solid.

TABLE 1

Thermochemistry of HCl (g) Reaction with Filter Cake

| Reactant | Process | ΔH (kcal/mol) | Moles (per kg) | ΔH/kg cake |
|---|---|---|---|---|
| HCl (g) | Solution | −18.0 | 12.0 | −173 |
| Mg(OH)$_2$ | Neutralization | −21.4 | 1.3 | −27 |
| MgSiO$_3$ | Conversion | −18.7 | 0.9 | −17 |
| MgGeO$_3$ | Conversion | 7.4 | 0.4 | 3 |
| GeCl$_4$ | Vaporization | 7.9 | 0.4 | 3 |

In fact, even in the absence of special thermal insulation, the measured reactor temperatures were found to exceed and remain well above 90° C. Approximately 83% of this energy is derived from the heat of solution of HCl gas. Thus, the present invention does not require the costly drying or a highly insulated reactor vessel which are both typically required when the chlorinating agent is an acid.

Figure 3:
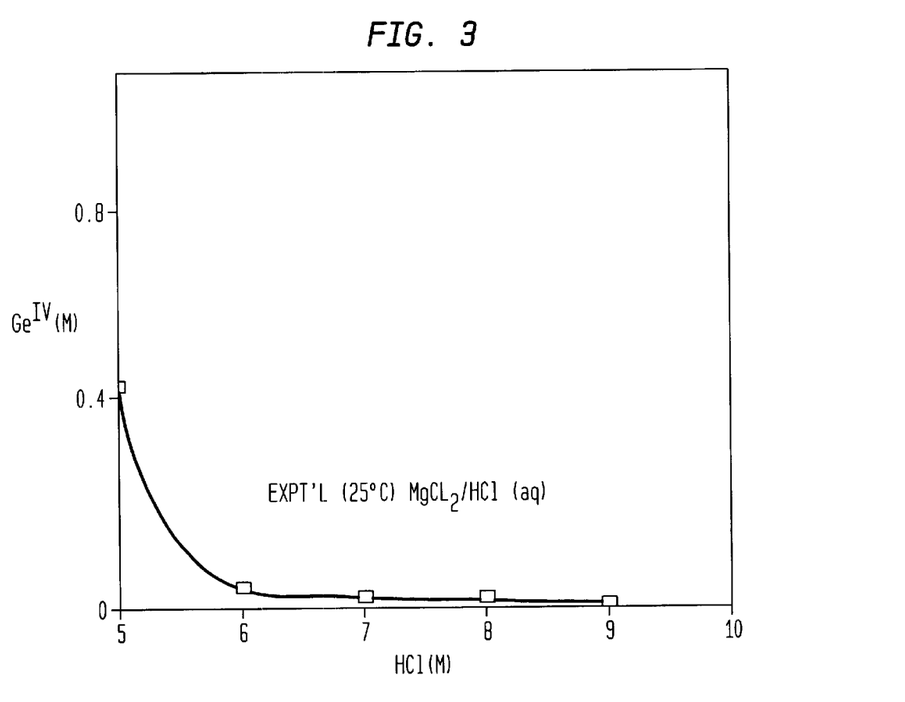
FIG. 3 is a graph showing the influence of magnesium chloride on the solubility of germanium tetrachloride.

In addition, the kinetics and reaction yield of the method according to the present invention are not effected by reaction by-products. Magnesium chloride is a major by-product of the HCl conversion of filter cake and is produced in solution at concentrations up to about 3.2 moles/liter. The influence of MgCl$_2$ on the solubility of GeCl$_4$ in aqueous HCl solution (5–9M) was investigated to assess the salting out effects induced by the magnesium salt. The experiments were conducted in closed containers to insure that equilibrium was established between the excess of GeCl$_4$ and the aqueous and vapor phases of the reaction products. Normally, the solubility of Ge(IV) in aqueous HCl is highest at low concentrations of HCl but rapidly diminishes with increasing HCl concentration, falling from 0.4M GeCl$_4$ in a 7.77M HCl solution to<0.01M GeCl$_4$ in a 12.08M HCl solution. As illustrated in FIG. 3, a dramatic depression in the solubility of GeCl$_4$ is observed in solutions containing MgCl$_2$. While not wishing to be bound by theory, it is believed that this is a result of the presence of about 1.6M MgCl$_2$. The solubility of Ge(IV) is thus shifted towards solutions well below 5M HCl whereas, above 6M HCl, Ge(IV) becomes essentially insoluble in solutions which also contain the magnesium salt. Thus, the formation of MgCl$_2$ in the present invention unexpectantly facilitates the volatilization of GeCl$_4$ during the conversion process at HCl concentrations less than 6M.

The invention is now further explained with reference to the following examples. This invention is not intended to be limited by the particular examples described below.

Samples of filter cake having the composition indicated in Table 2, below, and having a germanium content of about 2.6 wt % as calculated by atomic absorption analysis were obtained.

TABLE 2

Composition of Filter Cake

| Component | Wt % of Total | Wt % of Solids |
|---|---|---|
| MgGeO$_3$ | 5.3 | 24 |
| MgSiO$_3$ | 9.2 | 42 |
| Mg(OH)$_2$ | 7.5 | 34 |
| Ge | 2.6 | 12 |
| Si | 2.6 | 12 |
| Mg | 6.2 | 28 |

The total solids content of the samples were in the range of from about 20–22% by weight.

Figure 4:
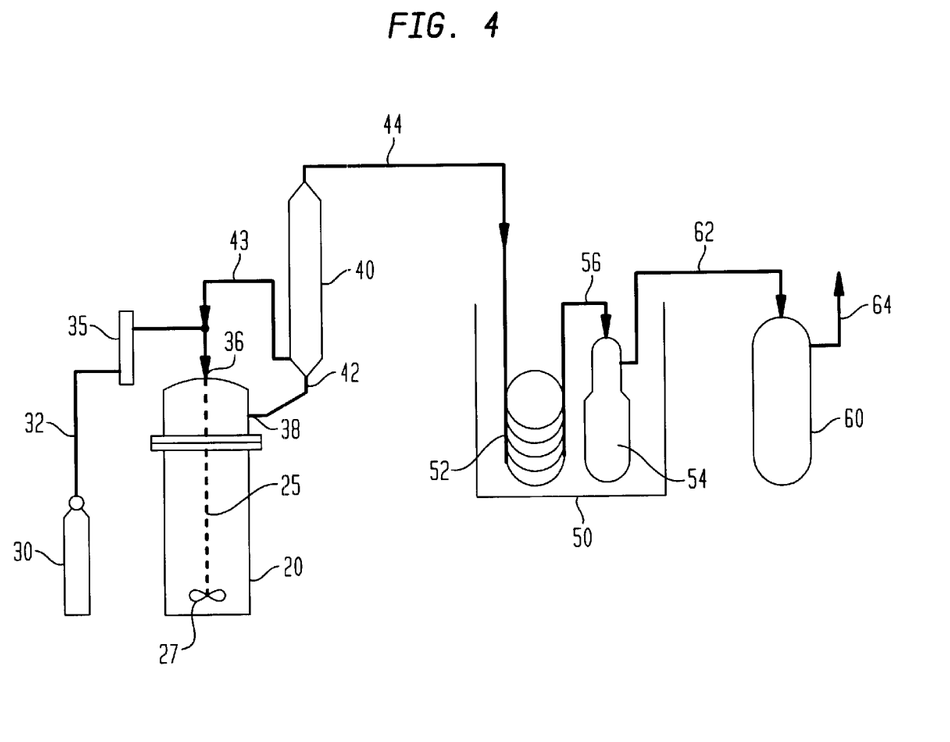
FIG. 4 shows a schematic apparatus for processing the filter cake by HCl gas according to the present invention.

Reference is now made to FIG. 4. The recovery of germanium from filter cakes using HCl (g) was studied using the apparatus illustrated schematically in FIG. 4. A reactor 20 was designed to contain about one kilogram of sample and was fitted with a Teflon™-valved gas inlet tube 25 which extended to about one inch above the bottom of the reactor 20. A filter cake sample obtained from the MCVD process was introduced into the reactor 20. The cake solids were crushed to arrive at particulate sizes suitable for the experimental apparatus. HCl(g) is delivered from the HCl container 30 through conduit 32 and into reactor inlet 36. The HCl(g) delivery rate is controlled by one or a plurality of flowmeters 35 that were specifically calibrated for HCl(g) and covered a delivery range of from about 20 cc/min to about 12.0 liters/min. The flowmeters 35 are preferably obtained from Gilmont Instruments, and are formulated from all Teflon™-glass. The introduction of HCl(g) into reactor 20 requires agitation of the reaction mixture by agitator 27 to enhance mass transfer of HCl to the solid and solution phase of the germanate containing solid.

The reactor outlet port 38 is connected to a vertical column 40. Vertical column 40 in the experimental apparatus is preferably about 2 ft. in length and about ¾' in diameter. The vertical column 40 functions to condense and return the bulk of the aqueous vapors to the reactor 20 via conduit 43 but allow passage of GeCl$_4$(g) and HCl(g) via column outlet conduit 44. Effluents exiting the column 40 via conduit 44 are passed through a cryogenic system 50 maintained at temperatures ranging from about 0 to about −20° C. by a salt bath. The cryogenic system 50 includes a glass coil 52 being about 10 ft. in length and having an outside diameter of about ¼ in. The glass coil 52 is connected by conduit 56 to one or several glass reservoirs 54 (only one being shown) that are specifically designed for the collection and subsequent treatment of the evolved GeCl$_4$. Effluents, primarily HCl(g), passing through the cryogenic system are fed into the gas scrubber 60 via conduit 62. The effluents from the cryogenic system 50 are treated with an aqueous caustic solution in the gas scrubber 60 before exhausting via conduit 64.

Figure 5:
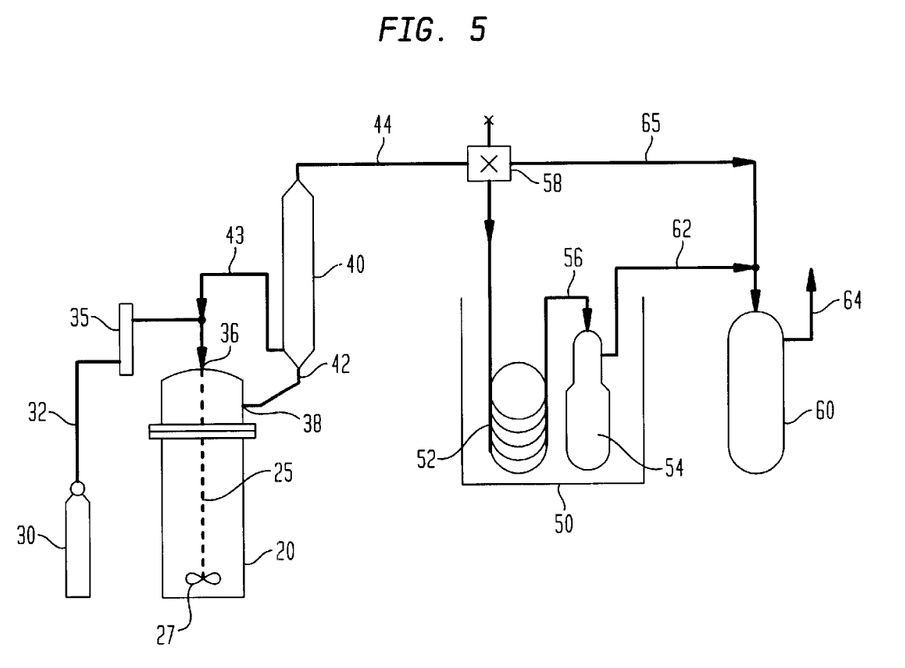
FIG. 5 shows a schematic apparatus for determining the efficiency of a cryogenic apparatus in the processing of a filter cake by HCl gas according to the present invention.

For experiments in which reaction efficiencies and the rate of production of GeCl$_4$ were determined for various HCl(g) flow rates, the cryogenic system 50 was by-passed and effluents exiting the stripper column 40 were fed directly into the gas scrubber 60 via conduit 65 which contained about 3 liters of concentrated caustic as shown in FIG. 5. Aliquots (about 5 ml) of the scrubber solutions were taken versus reaction time and their Ge content was determined by atomic absorption analysis. The reaction efficiencies were determined from measured values of the total evolved GeCl$_4$ and the residual Ge content of spent reactor fluids.

The efficiency of the laboratory size cryogenic system 50 for condensing GeCl$_4$ from the effluent stream 44 was determined for various reaction conditions and different cryogenic temperatures. The total GeCl$_4$ collected was first hydrolyzed by passing concentrated caustic solution through the coil condenser to the reservoir. The Ge content of the resulting solution and the total germanium which had been trapped in the scrubber solution were determined and provided a measure of the cryogenic trapping efficiency. Infrared and atomic absorption data were also obtained for the GeCl$_4$ product collected from several experimental runs.

The influence of magnesium chloride, a major reaction by-product, on the relative ease of separation of GeCl$_4$ from the reaction mixture was evaluated by determining the solubility of GeCl$_4$ in solutions about 1.6M MgCl$_2$ and 5 to 9M HCl. The experiments were carried out under conditions in which all phases (GeCl$_4$-solution-vapor) were in equilibrium. Samples of the solution phases were extracted via syringes and rapidly diluted to avoid losses of GeCl$_4$. The Ge content of the diluted solutions was then determined by atomic absorption analysis.

Figure 6:
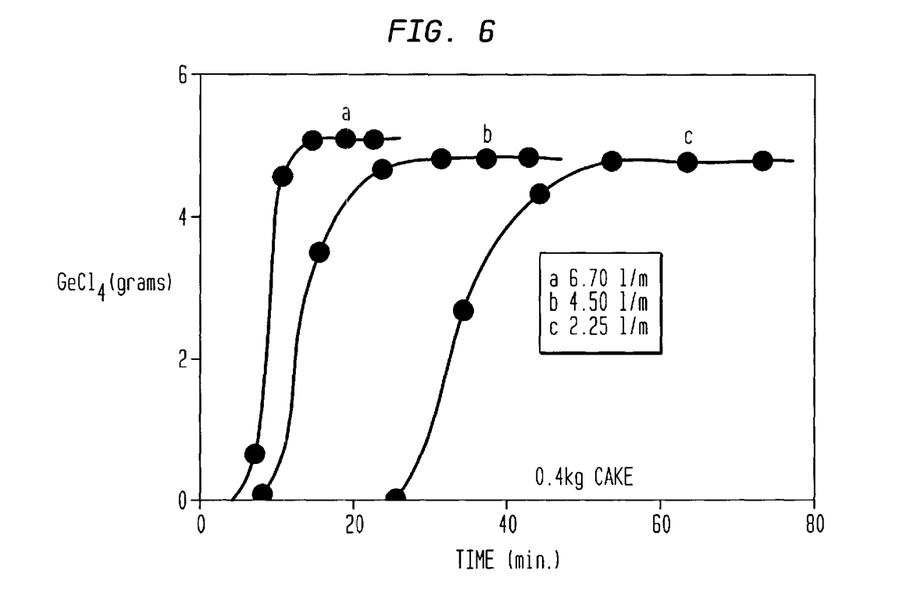
FIG. 6 shows the production of germanium tetrachloride versus time for selected HCl flow rates.

The stages through which the reaction of filter cake with HCl gas proceeds can be defined as a function of the HCl(g) delivery rate. Reference is now made to FIG. 6. The figure shows three different exemplary HCl(g) flow rates: (a) 6.7 l/min, (b) 4.50 l/min and (c) 2.25 l/min. This figure illustrates the production of GeCl$_4$ versus time for different HCl(g) flow rates with a constant sample charge (400 grams). In each case, an apparent induction period, the length of which is inversely dependent on the HCl(g) flow rate, is observed. These times correspond roughly to the total time required for HCl adsorption and liquification of the solids, neutralization and conversion of the magnesium salts and an increase in HCl concentration to levels at which rapid formation and volatilization of GeCl$_4$ commences. This data also illustrates that once these specific conditions are attained, GeCl$_4$ is rapidly evolved from the reaction mixture. As illustrated further in the data of Table 3, below, essentially complete conversion and evolution (>99.9%) of GeCl$_4$ was achieved in these experiments.

TABLE 3

Efficiency of HCl (g) Reaction with Filter Cake

| Sample Charge (g) | Ge (wt %) | HCl (g) flow rate (cc/min) | Total Residue (mg) | Ge found Evolved (mg) | % Ge Evolved |
|---|---|---|---|---|---|
| 400 | 1.1 | 6,700 | 2 | 4,720 | >99.9 |
| 400 | 1.1 | 4,500 | 3 | 4,440 | >99.9 |
| 400 | 1.1 | 2,250 | 2 | 4,470 | >99.9 |
| 100 | 2.6 | 200 | 48 | 2,590 | 98.2 |

The percent germanium evolved was calculated as the fraction of Ge collected in the gas scrubber solution to the total germanium found in the reactor residues and the scrubber solution. The total quantity of HCl gas required for these reactions varied from about 5.6 moles at a flow rate of about 2.25 liters/min. HCl(g) to about 4.4 moles at about 6.70 liters/min. HCl(g).

Figure 7:
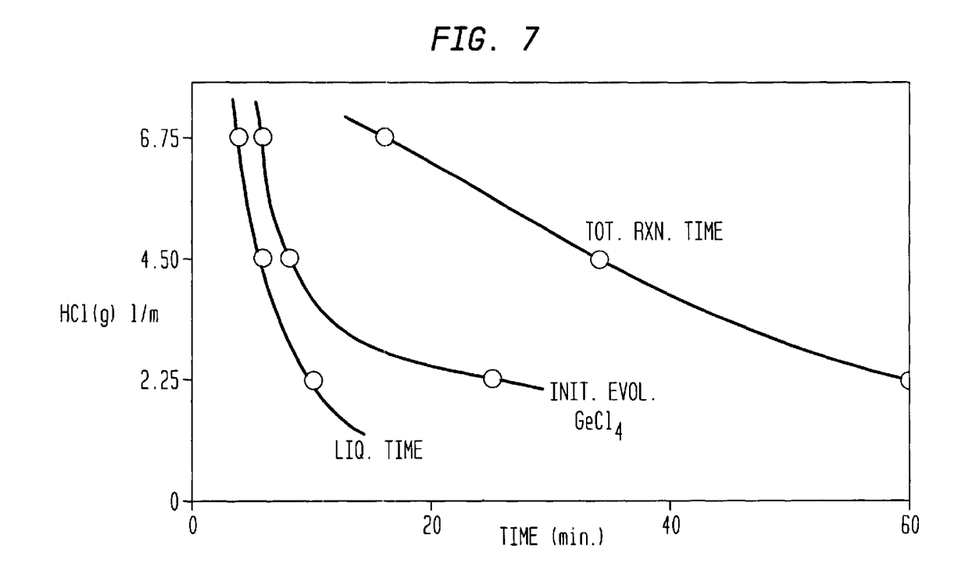
FIG. 7 shows the relationship between selected process variables as a function of HCl flow rate.

These results indicate that the HCl(g) reaction is primarily controlled by the rate of transfer of HCl(g) to the filter cake. In laboratory experiments, complete agitation of the initially solid materials proved difficult until nearly complete liquification had occurred. As such, the initial rate of transfer of HCl(g) to the solids was most likely not maximized. However, the data illustrated in FIG. 7 provides that, even under these laboratory conditions, exceedingly short liquification times, i.e. less than 5 minutes, are achieved at moderate HCl(g) flow rates. In production scale apparatus, adequate agitation can be provided to reduce mass transfer limitations found in the laboratory apparatus.

Previous methods for GeCl$_4$ distillation suffered from the likelihood of high losses of germanium due to co-precipitation with silicic acid gel or entrainment of GeCl$_4$ in the gas phase by HCl. According to the present invention, the co-precipitation with silicic acid gel is clearly not a problem because the efficiency of conversion and removal of GeCl$_4$ from the reaction mixture is demonstrated to be better than 99.9%. In addition, the efficiency of recovery of GeCl$_4$ from the gas phase by cryogenic trapping was investigated using an apparatus specifically designed to enhance condensation of GeCl$_4$. A packed (glass beads) U-shaped Pyrex condenser with a 50 ml reservoir at its base and maintained at −10° C. (salt bath) gave 99% recovery of GeCl$_4$ from HCl(g)–GeCl$_4$ (g) mixtures (about 200 cc/min). Thus, the present invention also does not suffer from the entrainment of GeCl$_4$ in the HCl gas phase.

Figure 8:
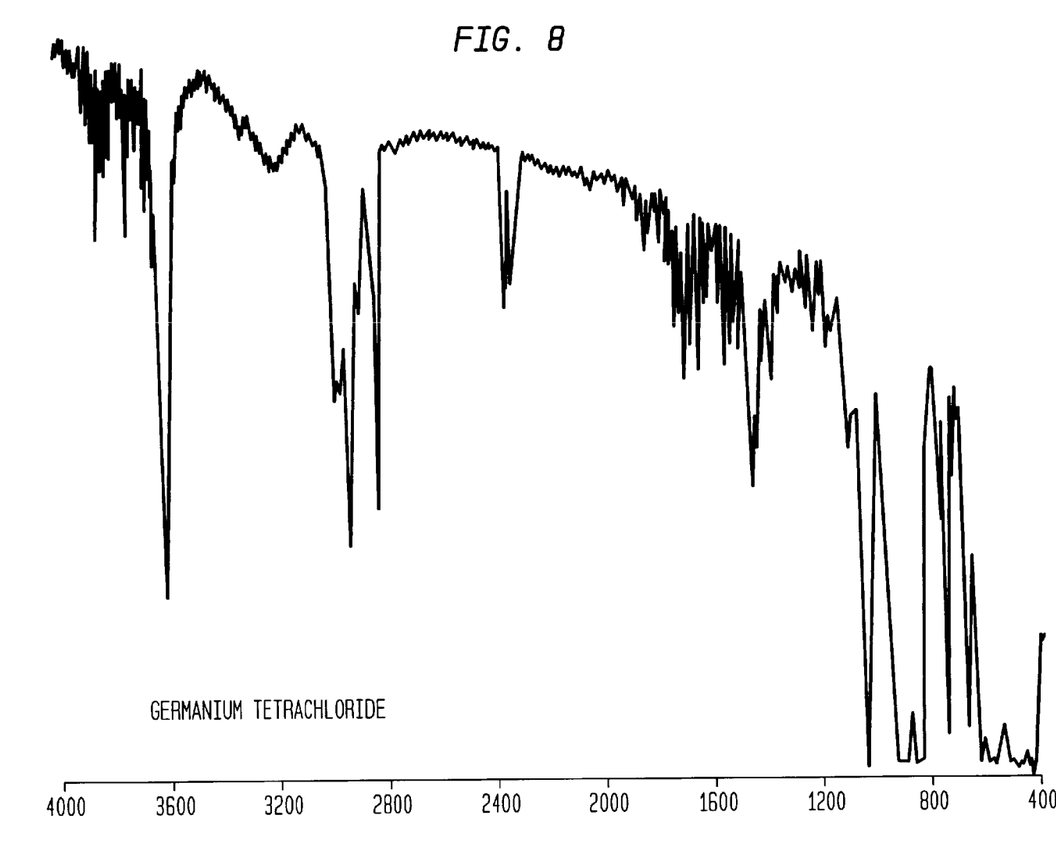
FIG. 8 shows the infrared spectrum of crude germanium tetrachloride product from HCl reaction with the filter cake.

The crude GeCl$_4$ product collected from several experimental runs was analyzed after hydrolysis by atomic absorption spectroscopy for the presence of Mg and Fe, two metallic elements that were considered to be potential contaminants. Neither of these elements was detected in the product (detection limits: about 0.3 ppm for Fe, about 0.02 ppm for Mg). An infrared spectrum of the crude liquid (4.0 mm IR cell), is shown in FIG. 8, which reveals the presence of hydrolysis products (Cl$_3$GeOH, HCl, etc.) but no evidence for significant levels of hydrocarbon contaminants. Thus, the present method efficiently produces germanium from the filter cake.

Figure 9:
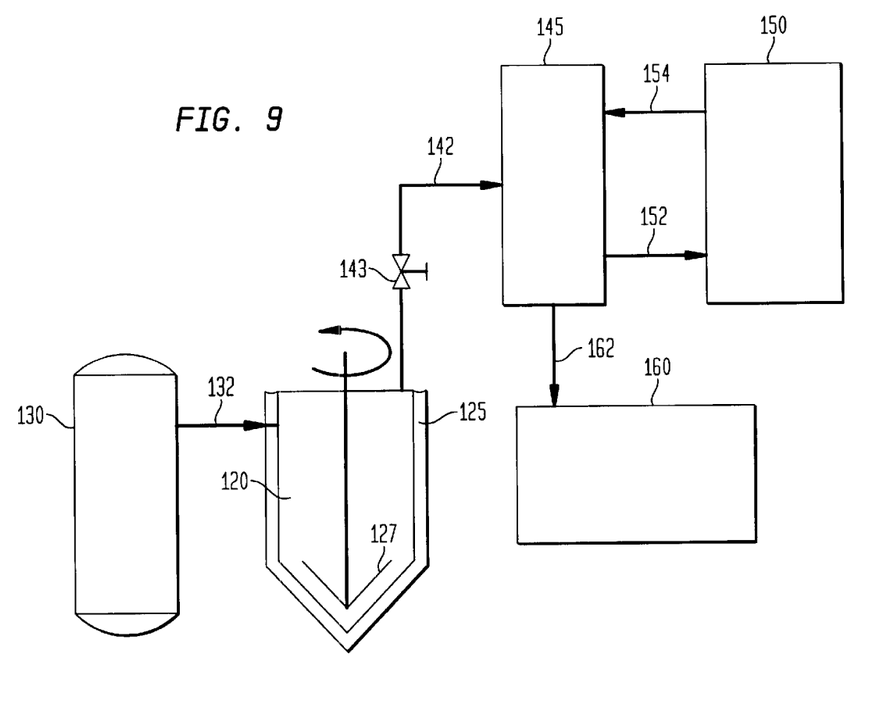
FIG. 9 shows a schematic diagram of a processing apparatus for processing the filter cake according to the present invention.

A schematic diagram of a production scale apparatus according to the present invention is provided in FIG. 9. The major equipment includes a pressurizable glass-lined reactor 120 having a capacity of about 300 gallons and being equipped with an outer, water-cooled jacket 125 for temperature control and a mechanical stirrer 127 for agitation of the solid cake materials. HCl gas is fed from HCl cylinder 130 via conduit 132 to reactor 120. Batch processing of the filter cake would preferably be conducted under constant HCl(g) pressure and upon completion of the conversion process, the volatile GeCl$_4$ product is then collected via a heat exchanger system 145 maintained at approximately −10° C. The output of the reactor 120 is fed to the heat exchange system 145 through conduit 142 and the output is controlled by valve 143. The excess heat obtained in the heat exchange system is controlled by communication with chiller 150 through conduits 152, 154. For direct reuse in a MCVD process, the initial GeCl$_4$ product must be purified to optical quality. A continuous ultra-purification processor 160 for the production of optical quality SiCl$_4$ may be added for this purpose. The purification processor 160 is in fluid communication with the heat exchange system 145 through conduit 162. This system incorporates a combination of purification stages that are equally applicable for the ultra-purification of GeCl$_4$. Hydrogen-bearing impurities are photochemically (UV, Cl$_2$) converted, in a primary stage, to the their more easily separated chlorinated derivatives in the purification processor 160. Under these conditions (oxidizing, Cl$_2$), several impurity species (As, Sb, Sn) commonly found in commercial grades of GeCl$_4$ are converted simultaneously to non-volatile forms which would be retained in distillation residues along with other metallic impurities. The system depicted in FIG. 9 thus represents a working model for the design and construction of a facility for the purification of GeCl$_4$ produced from filter cake materials.

The direct HCl gas conversion process possesses considerable economical advantage over conventional industrial processing methods which utilize concentrated hydrochloric acid for the production of GeCl$_4$ from germanium-bearing ores. In addition to the lower costs incurred for HCl in gaseous form, the gaseous reagent was shown to be capable of processing a much larger amount of filter cake than an equivalent amount of hydrochloric acid. Thus, the present invention provides an improved method for recovery of germanium from germanium containing ores. It should again be noted that although the invention has been described with specific reference to recovery of germanium from filter cakes produced as a by-product of optical waveguides, the invention has broader applicability and may be used in the recovery of germanium from any germanium containing materials, such as germanium ores, or the like. Accordingly, the above description and accompanying drawings are only illustrative of preferred embodiments which can achieve the features and advantages of the present invention. It is not intended that the invention be limited to the embodiments shown and described in detail herein. The invention is only limited by the scope of the following claims.

What is claimed as new and desired to be protected by Letters Patent of the United States is:

1. A method for the recovery of germanium from a germanium containing solid comprising:

contacting a germanate-containing solid having a high water content with gaseous chlorine containing agent to form germanium tetrachloride, without heating or drying said germanate-containing solid prior to said contacting; and recovering germanium in the form of said germanium tetrachloride.

2. The method according to claim 1, wherein said gaseous chlorine containing agent is gaseous hydrogen chloride.

3. The method according to claim 2, wherein said germanate-containing solid is contacted with said gaseous hydrogen chloride in a reactor vessel, wherein said gaseous hydrogen chloride is flowed into said reactor at a flow rate of from about 1 to about 120 liters gas/min/kg germanate containing solid.

4. The method according to claim 3, wherein said gaseous hydrogen chloride is flowed into said reactor vessel at a flow rate of about 5 to about 30 liters gas/min/kg germanate containing solid.

5. The method according to claim 3, wherein said hydrogen chloride gas is added to said reactor vessel from about 8 to about 50 moles per kg germanate containing solid.

6. The method according to claim 5, wherein said hydrogen chloride gas is added to said reactor vessel from about 12 to about 20 moles per kg germanate containing solid.

7. The method according to claim 5, wherein said hydrogen chloride gas is added to said reactor vessel from about 6 to about 8 moles per kg germanate containing solid.

8. The method according to claim 2, wherein said germanate containing solid is contacted with said gaseous hydrogen chloride in a reactor vessel at a time from about 5 to about 120 minutes.

9. The method according to claim 8, wherein said germanate containing solid is contacted with said gaseous hydrogen chloride in a reactor vessel at a time from about 10 to about 40 minutes.

10. The method according to claim 2 wherein said germanate containing solid is a filter cake.

11. The method according to claim 2, wherein said germanium tetrachloride is volatized in an exothermic reaction.

12. The method according to claim 2, further comprising treating said germanium tetrachloride in a cryogenic apparatus to recover germanium in the form of condensed germanium tetrachloride.

13. The method according to claim 2, further comprising agitating said germanate containing solid during contact with said gaseous hydrogen chloride.

14. The method according to claim 2, wherein said method is a batch process.

15. The method according to claim 1 wherein said germanate containing solid is a filter cake.

16. The method according to claim 1, further comprising treating said germanium tetrachloride in a cryogenic apparatus to recover germanium in the form of condensed germanium tetrachloride.

17. The method according to claim 1, further comprising agitating said germanate containing solid during contact with said gaseous chlorine containing agent.

18. The method of claim 1, wherein said water content of said training solid is in the range of about 78 to 80 wt. %.

19. A method for the recovery of germanium from a germanium-containing solid comprising:

placing a germanate-containing solid having a high water content into a reactor vessel, without subjecting the germanate-containing solid to a drying process;

agitating said germanate-containing solid while contacting said germanate-containing solid with gaseous hydrogen chloride to form germanium tetrachloride, wherein the presence of magnesium chloride as a by-product of a reaction between said solid and said hydrogen chloride facilitates the formation of said germanium tetrachloride by decreasing the solubility of said germanium tetrachloride; and recovering germanium in the form of said germanium tetrachloride.

20. The method according to claim 19, wherein said gaseous hydrogen chloride is flowed into said reactor vessel at a flow rate of from about 1 to about 120 liters gas/min/kg germanate containing solid.

21. The method according to claim 19, wherein said gaseous hydrogen chloride is flowed into said reactor vessel at a flow rate of about 5 to about 30 liters gas/min/kg germanate containing solid.

22. The method according to claim 19, wherein said germanate containing solid is contacted with said gaseous hydrogen chloride in a reactor vessel at a time from about 5 to about 120 minutes.

23. The method according to claim 19, wherein said germanate containing solid is contacted with said gaseous hydrogen chloride in a reactor vessel at a time from about 10 to about 40 minutes.

24. The method according to claim 19 wherein said germanate containing solid is a filter cake.

25. The method according to claim 19, further comprising treating said germanium tetrachloride in a cryogenic apparatus to recover germanium in the form of condensed germanium tetrachloride.

26. The method according to claim 19, further comprising placing said germanium tetrachloride formed in said reactor vessel into a stripper column to condense bulk aqueous vapors, which result from a reaction between said germanate-containing solid and said gaseous hydrogen chloride, and return remaining said bulk aqueous vapors to said reaction vessel while allowing said germanium tetrachloride to pass to a cryogenic apparatus for recovery of germanium in the form of effluents comprising condensed germanium tetrachloride.

27. The method according to claim 26, further comprising passing the effluents from the cryogenic apparatus to a gas scrubber where said germanium is further evolved from said effluents, said effluents comprising said condensed germanium tetrachloride.

28. A method for the recovery of germanium from a germamum-containing solid comprising:

placing a germanate-containing solid having a high water content into a reactor vessel;

agitating said germanate-containing solid in said reactor vessel;

flowing gaseous hydrogen chloride into said reactor at a flow rate of from about 5 to about 100 liters gas/min/kg germanate-containing solid to contact said germanate-containing solid;

reacting said germanate-containing solid with said gaseous hydrogen chloride for a time of from about 5 to about 120 minutes to form germanium tetrachloride, without heating or drying said germanate-containing solid prior to said reacting; and transporting said germanium tetrachloride to a cryogenic apparatus to recover germanium in the form of germanium tetrachloride.

29. The method according to claim 28, wherein said gaseous hydrogen chloride is flowed into said reactor vessel at a flow rate of from about 5 to about 30 liters gas/min/kg germanate containing solid.

30. The method according to claim 28, wherein said germanate containing solid is contacted with said gaseous hydrogen chloride in said reactor vessel at a time from about 10 to about 40 minutes.

31. The method according to claim 28 wherein said germanate containing solid is a filter cake.

32. The method according to claim 31, wherein said filter cake has a germanium content of about 1 to about 3 percent by weight.

33. The method according to claim 28, further comprising transporting said germanium tetrachloride formed in said reactor vessel into a stripper column to condense bulk aqueous vapors which form from the reaction of said germanate-containing solid with said gaseous hydrogen chloride and return remaining said bulk aqueous vapors to said reaction vessel while allowing said germanium tetrachloride to pass to said cryogenic apparatus for recovery of effluents comprising germanium in the form of germanium tetrachloride.

34. The method according to claim 33, further comprising passing the effluents from said cryogenic apparatus to a gas scrubber where said germanium is further evolved from said effluents, said effluents comprising said condensed germanium tetrachloride.

35. The method of claim 28, wherein said water content of said germanate-containing solid is in the range of about 78 to 80 wt. %.

* * * * *